United States Patent
Saeed Tehrani

(10) Patent No.: US 7,427,047 B2
(45) Date of Patent: Sep. 23, 2008

(54) POWERED AIRCRAFT INCLUDING INFLATABLE AND ROTATABLE BODIES EXHIBITING A CIRCULAR CROSS-SECTION PERPENDICULAR TO ITS ROTATION AXIS AND IN ORDER TO GENERATE A LIFT FORCE

(76) Inventor: Omid Saeed Tehrani, 44870 Joy Rd., Plymouth, MI (US) 48170

( * ) Notice: Subject to any disclaimer, the term of this patent is extended or adjusted under 35 U.S.C. 154(b) by 341 days.

(21) Appl. No.: 11/138,130

(22) Filed: May 26, 2005

(65) Prior Publication Data

US 2006/0124800 A1 Jun. 15, 2006

Related U.S. Application Data

(63) Continuation-in-part of application No. 10/709,493, filed on May 10, 2004, now abandoned.

(51) Int. Cl.
*B64C 39/00* (2006.01)
*B64C 27/00* (2006.01)

(52) U.S. Cl. ..................................................... 244/21

(58) Field of Classification Search ................... 244/19, 244/21

See application file for complete search history.

(56) References Cited

U.S. PATENT DOCUMENTS

| | | | | | |
|---|---|---|---|---|---|
| 1,714,609 | A | * | 5/1929 | Massey | 244/10 |
| 1,832,396 | A | * | 11/1931 | Howard | 244/21 |
| 1,840,594 | A | * | 1/1932 | Minor | 244/200 |
| 1,854,520 | A | * | 4/1932 | Medvedeff | 244/10 |
| 1,927,535 | A | * | 9/1933 | Zaparka | 244/10 |
| 1,927,537 | A | * | 9/1933 | Zaparka | 244/10 |
| 1,927,538 | A | | 9/1933 | Zaparka | 244/14 |
| 2,417,358 | A | * | 3/1947 | Grose | 244/21 |
| 2,985,406 | A | * | 5/1961 | Bump | 244/10 |
| 3,065,928 | A | * | 11/1962 | Dornier | 244/10 |
| 3,140,065 | A | * | 7/1964 | Alvarez-Calderon | 244/10 |
| 4,243,190 | A | | 1/1981 | Sams | 244/153 |
| 4,366,936 | A | | 1/1983 | Ferguson | 244/2 |
| 4,446,379 | A | | 5/1984 | Borg et al. | 290/55 |
| 4,452,007 | A | * | 6/1984 | Martin | 446/45 |
| 4,482,110 | A | | 11/1984 | Crimmins, Jr. | 244/26 |
| 4,576,581 | A | | 3/1986 | Borg | 440/86 |
| 4,582,013 | A | | 4/1986 | Holland, Jr. | 114/102 |
| 4,630,997 | A | | 12/1986 | Cousteau et al. | 416/90 |
| 4,635,474 | A | | 1/1987 | Blackwood | 73/189 |
| 5,180,119 | A | | 1/1993 | Picard | 244/10 |
| 5,645,248 | A | | 7/1997 | Campbell | 244/30 |

(Continued)

*Primary Examiner*—Michael R. Mansen
*Assistant Examiner*—Joseph W Sanderson
(74) *Attorney, Agent, or Firm*—Gifford, Krass, Sprinkle, Anderson & Citkowski, P.C.

(57) ABSTRACT

A lift force generating aircraft having an engine and a thrust force producing device. A pair of elongated and rotating bodies, an axial centerline through the bodies extending in a direction substantially perpendicular to a fore to aft axis extending between the engine and thrust-producing device and at a location above a center of gravity associated with the engine and thrust-producing device. The rotating bodies being constructed of a material inflatable to a desired pressure. A rotary output associated with the engine rotating the bodies, causing them to deflect to angles lesser than the perpendicular with the fore to aft axis, and in response to air stream forces acting upon the bodies in order to reduce drag forces experienced on a rear side of the rotating bodies.

16 Claims, 10 Drawing Sheets

U.S. PATENT DOCUMENTS

| | | | |
|---|---|---|---|
| 5,875,627 A | 3/1999 | Jeswine | 60/201 |
| 5,909,859 A | 6/1999 | Janicki | 244/153 |
| 6,666,650 B1 | 12/2003 | Themel | 416/200 |

* cited by examiner

POWERED AIRCRAFT INCLUDING INFLATABLE AND ROTATABLE BODIES EXHIBITING A CIRCULAR CROSS-SECTION PERPENDICULAR TO ITS ROTATION AXIS AND IN ORDER TO GENERATE A LIFT FORCE

CROSS REFERENCE TO RELATED APPLICATIONS

The present application is a continuation-in-part of U.S. application Ser. No. 10/709,493, filed May 10, 2004, now abandoned entitled "A Powered Aircraft Including Inflatable and Rotatable Bodies Exhibiting a Circular Cross-Section Perpendicular to Its Rotation Axis and In Order to Generate a Lift Force".

BACKGROUND OF INVENTION

1. Field of the Invention

This invention relates generally to aerodynamics and flight dynamics devices. More particularly, the present invention teaches a powered aircraft device incorporating substantially cylindrical shaped and power rotated components for creating lift. Specifically, the current invention significantly reduces poor fuel economy and problems of acceleration to higher speeds associated with prior art Magnus effect rotor airfoils, by significantly decreasing drag forces associated with such acceleration.

2. Discussion of the Prior Art

The present invention operates from the physics principle of the Magnus effect, which is most obvious when a rotating cylinder is moved in an inviscid fluid and generates a force at right angles relative to the stream line flow of fluid (such as air), this being perpendicular to the rotation axis, and as is well known in the art to physicists and engineers. The idea of using this effect in flight has its traces in history.

U.S. Pat. No. 1,927,538, issued to Zaparka (1933), teaches a means for producing an accelerated air stream in a plurality of different applications, including aircraft, dirigibles and ships. As regards to aircraft applications, a rotor airfoil is supported within the accelerated air stream, the surface thereof being driven at a rotational speed such as between three to four times that of the accelerated air stream. The rotor airfoil is propelled by the air turbines from a slip stream associated with the propeller or from an air stream passing the plane in the event of the motor being inoperative. A bevel gear arrangement is provided, for converting the driving force of the engine to the rotating force of the rotor airfoils.

Some designs utilizing rotating cylinders in aircraft and also in submarines, use the flowing fluid around the crafts to rotate the rotating bodies, and as opposed to using engine power directly. In such instances, there is no prediction for neutralizing of the reaction force to the rotation of the rotating bodies by the engine. Additionally, the lack of engine power in those designs causes a low amount of lift force generation.

Problems associated with earlier rotating airfoil devices include the low efficiency of rotating bodies in comparison to the conventional airfoils in generating lift forces with the same degree of energy input. A secondary problem includes the turbulent flow that appears at the back of the rotating bodies, which especially increases forward speed, likewise increasing drag force and decreasing speed thereby preventing acceleration and leading to lower efficiency in lift force generation in comparison to the conventional airfoils. Due to this problem, the machines which have been designed up to now have the problem of limited flying speed and acceleration in addition to the poorer fuel economy in comparison to conventional airfoil using aircrafts.

Other examples drawn from the prior art include U.S. Pat. No. 5,180,119, issued to Picard, and which teaches a vertical lift system created through tangential blowing of air jets channeled over the top of rotating (Magnus) cylinders. The part of the cylinder's surface swept by such a jet (useful segment) is delimited upstream by a nozzle "splitting" a sheet of air almost tangentially over the cylinder and downstream by a vane which will skim the surface of the cylinder and direct the jet away from the surface of the rotating cylinder.

U.S. Pat. No. 5,875,627, issued to Jeswine, teaches a propulsion system for accelerating and directionally controlling a fluid having a continuous dynamic surface for circulating through a fluid from an entrainment region where fluid is introduced to the dynamic surface to a thrust region where fluid is discharged from the dynamic surface. The dynamic surface accelerates the fluid proximate to the surface so as to produce a layer of accelerated fluid from the entrainment region through the thrust region. A motor is operatively connected to the dynamic surface for driving the dynamic surface. The separator plate has a leading edge for stripping the layer of accelerated fluid from the dynamic surface, and a substantially flat thrust face adjacent to the leading edge for directing the accelerated fluid in a desired direction. The separator plate is positionable with respect to the dynamic surface such that the leading edge is generally in close proximity to the dynamic surface, and the thrust face is substantially tangential to the dynamic surface for at least a portion of the thrust region.

A final example drawn from the prior art is set forth in U.S. Pat. No. 4,582,013, issued to Holland, and which teaches a self-adjusting wind power machine for economical recovery of wind power and which employs a self-adjusting mass-balanced aerodynamic blade weathervaning freely around a lengthwise pitching axis forward of its aerodynamic center, and an aerodynamic roller in its leading edge, spun at a high RPM by a motor. The roller controls aerodynamic performance to high levels of efficiency at high lift coefficients, employing novel roller/airfoil profiles. In marine applications, the self-adjusting blade with roller stopped acts like a furled sail, with the blade held angling to the wind with the roller spinning. On a horizontal axis wind turbine, the self-adjusting blade is continuously held to an efficient angle of attack by centrifugal lift-increasing pitching moments balancing aerodynamic lift-decreasing pitching moments. The blade whirls steadily despite fluctuations of wind speed and direction, reducing stresses and preventing structural damage of loss of efficiency.

SUMMARY OF THE INVENTION

The present invention discloses a novel lift-generating aircraft incorporating a plurality of lift force producing and rotating bodies. In a preferred embodiment, these are combined with a thrust force producing propeller, an engine, a body and frame, two pulleys and an associated connecting belt. The lift force producing and rotating bodies each exhibit a circular cross-section, extending crosswise on either side of the machine, and relative to a fore to aft longitudinal axis generally corresponding to a fuselage section of the aircraft.

The rotating bodies are each further connected to and rotated by a pulley. The attachment to the pulley can be made rigid or flexible. The rotating bodies can be either rigid or flexible, if flexible allowing them to rotate, as well as bend backwards in a direction towards the fore to aft axis at high speeds, at their junction with pulley, thus resulting in decreased turbulence of the air at the back of the rotating bodies and ultimately a decrease in drag forces. The pulley connected to the rotating bodies is in turn connected by a belt to a further pulley installed on a shaft connected to the engine. The shaft runs lengthwise, in a direction generally consistent with the fore to aft axis, and from the engine to the propeller at the end.

In operation, rotation of the propeller functions as a thrust force generating device. In order to maintain correct positioning of the components, the engine is fixed to a frame, from which extend in crosswise fashion the rotating cylindrical shaped bodies, these further typically being positioned in an uppermost location relative to the frame. In one application, the frame includes provision for four smaller sized rollers which rotate easily in order to render a low friction bed for the rotating bodies, the pulley being connected to each of them.

Accordingly, an advantage achieved by the current invention is in reduced fuel consumption and due to less drag force created in comparison to prior art lift-generating devices which use rotating bodies to generate lift force. When considering that drag forces, caused by turbulent airflow at the back of rotating bodies, increase as a result of increased forward speed, this effect has been reduced in the current invention as a result of the ability to modify (or vary) the angle established between the rotation (crosswise) axis of the rotating bodies and the fore to aft axis of the machine. Swiping (or again bending) back of the rotating bodies, reduces this angle from 90 degrees, resulting in a decrease in turbulence occurring behind the rotating bodies, with an ultimate decrease in the drag forces.

Another advantage of the current invention is its ability to create effective lift forces in an environment of reduced accelerated air streams flowing past the rotating bodies, this in effect resulting in lesser or no required takeoff speed (i.e., vertical takeoff capability) and which makes possible takeoff and landings from a surface location requiring little or no runway length. This feature is a result primarily of lift forces generated by the rotating bodies, those forces being varied by the driving speed of the rotating bodies, in comparison to airfoils rotated in the prior art, the present invention making possible vertical lift at lower speeds and also due again to the decrease in drag forces experienced by the frame by the bending backwards of the rotating bodies to a decreased angle between the crosswise extending and rotating bodies and the fore to aft axis mentioned above.

Yet another advantage achieved by the current invention is the stability of flight and resistance in leaning to left or right during flight, this due to the gyroscopic effect generated by rotation of the rotating bodies, i.e., resistance of the rotating bodies to rotations along axes other than its rotation axis (gyroscopic effect).

A still further advantage of the current invention is the usage of inflatable rotating bodies, in a preferred variant, and as opposed to rigid rotating bodies. The use of an inflatable rotating body is optional in the present invention, however makes possible the ability to deflate the rotating body structure when needed, thus rendering the aircraft small enough to be packed, kept or carried in a very small space and makes it ideal for personal usage, especially with easy and cheap shipping/handling due to small occupied volume. A still further advantage of the current invention is the ability to employ differently sized engines to rotate the lift force producing bodies, and also in generating thrust force, both of which can be controllable. It is also envisioned that a separate engine can be used for the conventional propulsion systems in addition to a dedicated engine for driving the rotating bodies. Along these lines, it is understood that the reducing ratio established between the engine(s) can be modified, such as in conventional automotive applications, to vary gear ratios for separately driving the rotating bodies, as opposed to, say, an aircraft propeller.

Yet another advantage of the current invention is that, by using an engine as an active and direct method to rotate the rotating bodies, it is possible to generate significant lift forces even at initial and low speed forward motion, making it more practical compared to the systems using other methods of rotation for rotating bodies, and such as using the flowing air to rotate the rotating bodies as set forth in the Zaparka design.

Yet another advantage of the current invention is faster acceleration in flight, caused by taking off sooner and due to the additional lift force generation by rotating the bodies with engine power, and thus reducing friction with the ground after takeoff, the lower drag forces once again being due to the swiping/bending backwards of the rotating bodies.

Another advantage of the current design of this invention is the provision of three different ways to neutralize reaction forces produced by the rotating bodies, in a reverse direction to their rotation, and which can cause the lift-producing machine to rotate in the opposite direction. These new mechanisms, used to neutralize the reaction force to the rotation of the rotating bodies, and which make the new design specific include 1) placing the rotation axis of the rotating bodies offset from the center of gravity of the machine, this including placing the rotating axis preferably higher than, but also potentially in line or lower than, the machine's (aircraft's) center of gravity and direction of thrust; 2) placing the thrust forces of the aircraft lower than the centerline rotation axis of the rotating bodies; and 3) allowing the rotating bodies to bend backwards, relative to their crosswise extending axis, to decrease the angle between the rotation axis of the rotating bodies relative to the fore to aft axis, in particular to less than 90 degrees, thus resulting in the rotating bodies not being in alignment and their rotation reaction forces totaling less than their numerical summation.

Yet another advantage of the current invention is that, in the event of a problem appearing in the thrust generating devices, but not in the lift force generation part (rotating bodies), the aircraft as a result can land more securely compared to current aircrafts, this being due to any movement perpendicular to the axis of rotation inducing a force perpendicular to the axis of movement. Thus, if a problem in the propeller causes the aircraft not to move forward, the resultant reduced speed causes the creation of a force perpendicular to the direction of fall, this in turn generating a thrust force which increases the speed of vertical drop. Forward motion resulting from thrust forces experienced by the aircraft in turn causes the generation of a force perpendicular to forward motion, i.e. lift force, this generated lift force counteracting gravity forces, thereby decreasing vertical drop speed. In other words, by experiencing vertical drop, the rotating in turn generates a thrust force followed by a lift force.

Concurrent with the decreased need in runway space for takeoff, a yet further advantage of the current invention is the corresponding lesser requirement for a landing runway. As a result of the generation of more lift force at lower speeds by rotating bodies, it is possible that one can land at lower speeds and thus there is a lesser or no need for runway (such as again which makes possible vertical takeoffs and landings) depending on the rotation speed of the rotating bodies and the weight of the machine and its load (the heavier the load the more need for speed and the faster the rotation speed, the less the need for landing speed).

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Referring now to FIGS. 1-10, several variants are illustrated of a powered aircraft 10 which is capable of creating a lift-generating force through the provision of a plurality of rotatably driven rollers and according to Magnus effect physical principles. In particular, the present invention discloses an improved lift-generating aircraft which overcomes many of the drawbacks associated with the prior art Magnus effect lift devices.

Figure 1:
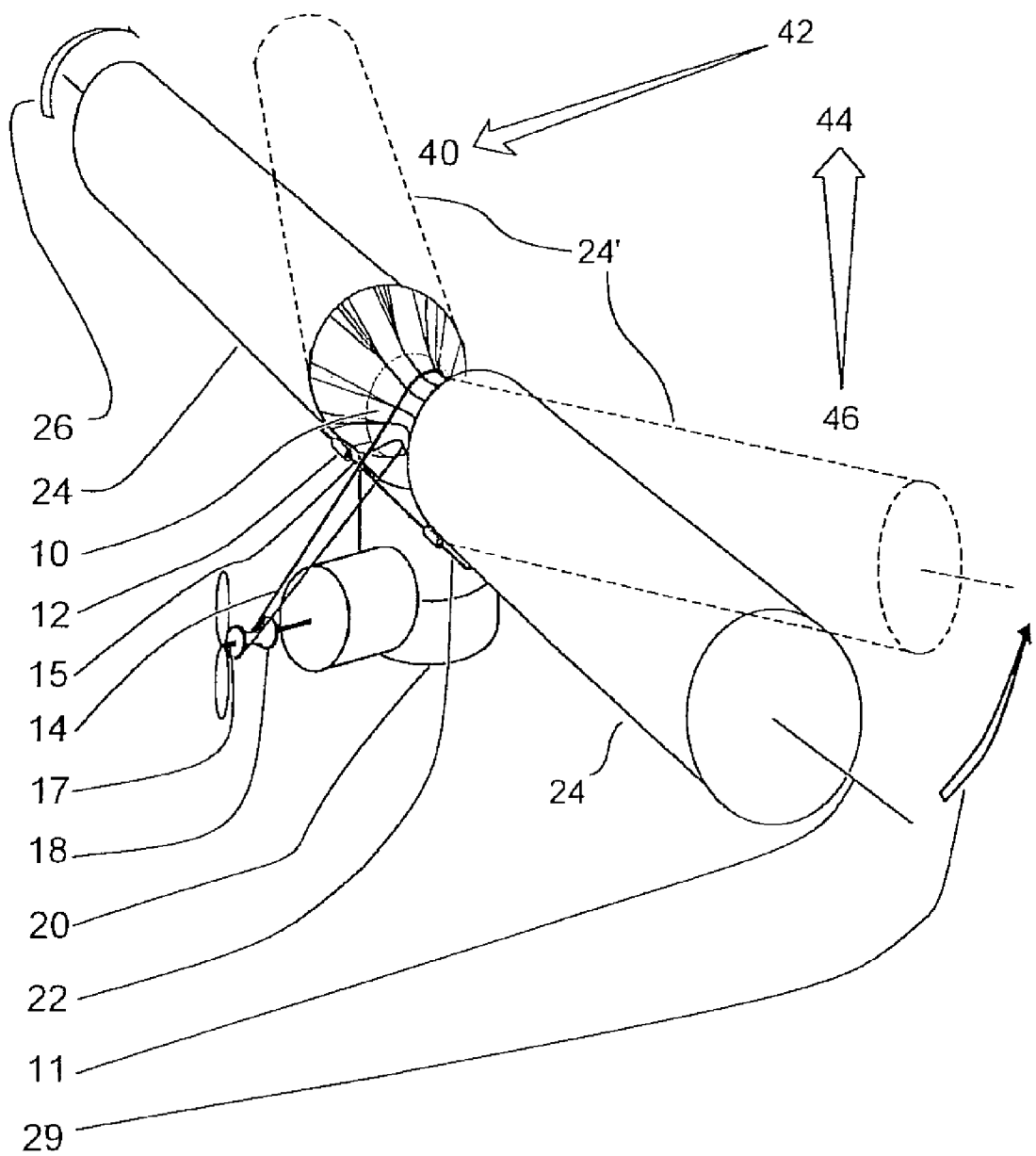
FIG. 1 is a perspective illustration of an arrangement of lift-generating components according to a first preferred embodiment of the present invention.

Referring to FIG. 1, a perspective illustration is shown of an arrangement of lift-generating components according to a first preferred embodiment of the present invention and which includes a pair of lift force producing rotating bodies (illustrated at 24 and as will be discussed in further detail), each exhibiting an elongated and crosswise extending circular cross-section through which extends a centerline and crosswise extending axis 11. As will be described in additional detail, the rotating cylindrical shaped bodies 24 are preferably constructed of a durable and inflatable material exhibiting the necessary properties of pressure retaining inflatability, however it is also understood that the rotating bodies can also be constructed of a solid material within the scope of the present invention.

Additional components associated with the lift-generating aircraft are disposed in a generally fore to aft extending axis, illustrated at 13 in FIG. 1 and generally corresponding to a fuselage portion of the aircraft. The axis 13 is established at a generally perpendicular direction relative to the crosswise extending axis 11 associated with a centerline extending through the rotating bodies, the crosswise axis 11 being located above the fore to aft axis 13, corresponding to the rotating bodies being located above a center of gravity associated with the aircraft.

Figure 2:
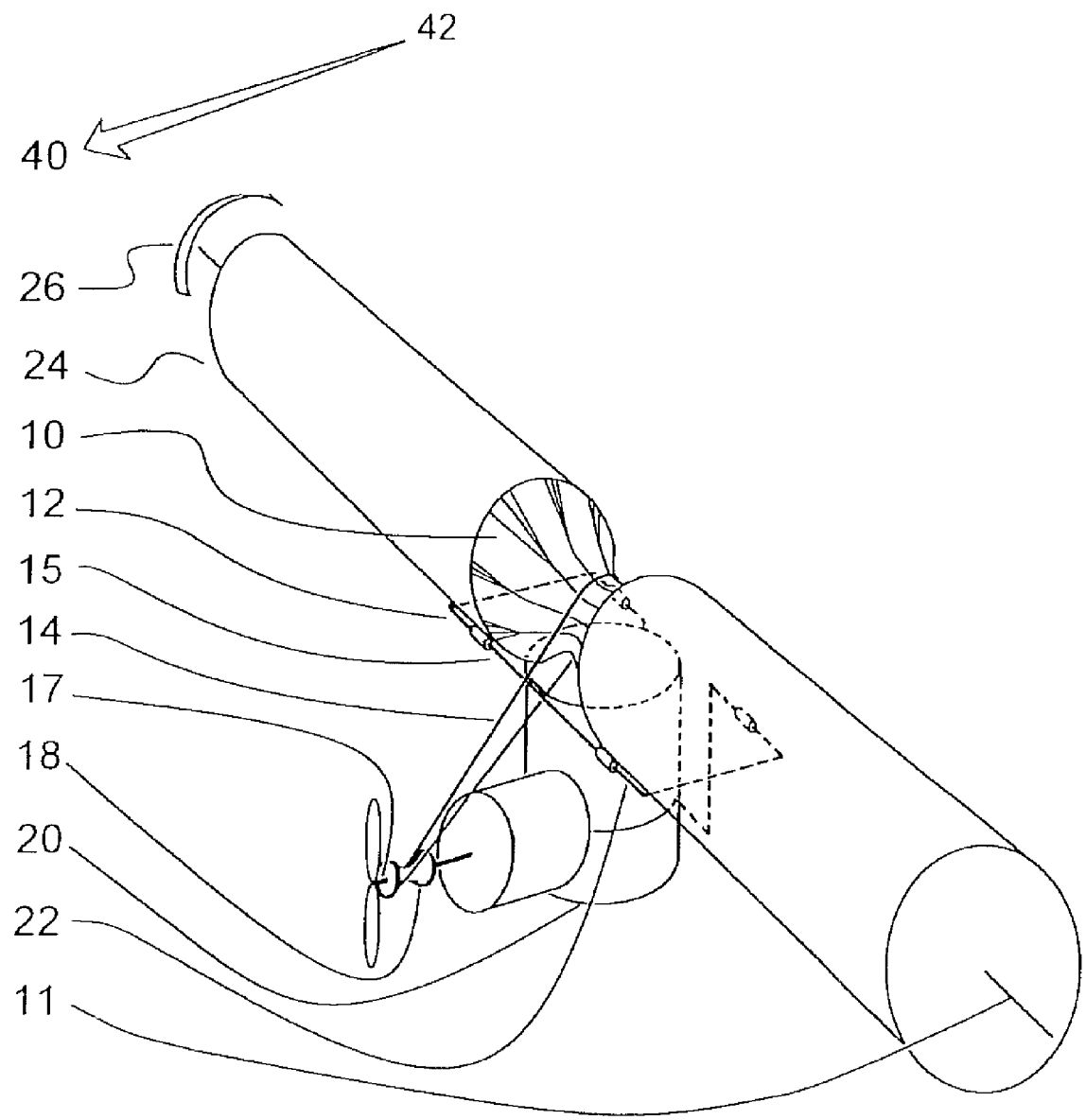
FIG. 2 is a perspective view similar to that shown in FIG. 1 and further illustrating in phantom the frame mounted and additional smaller rollers.
Figure 3:
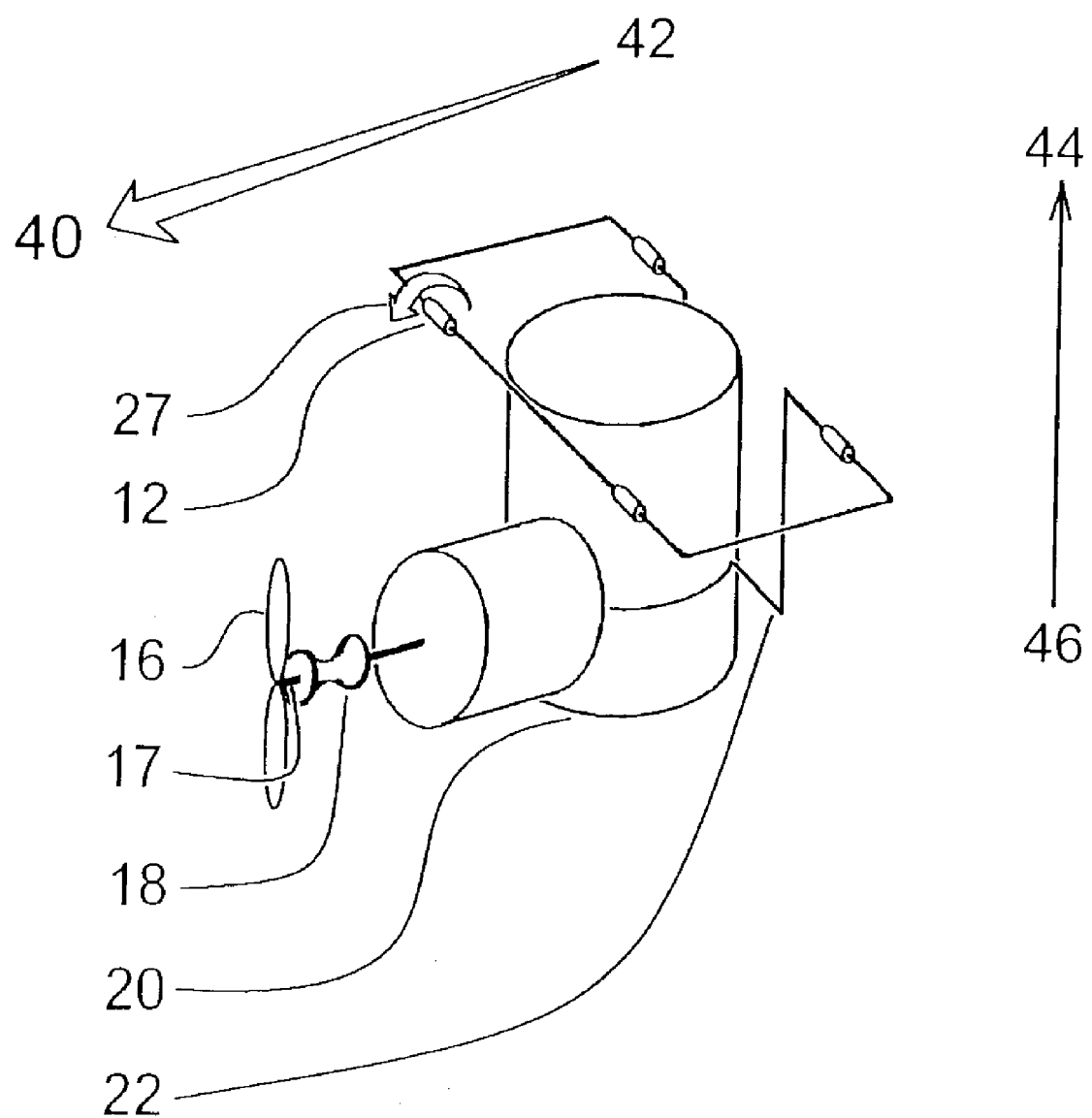
FIG. 3 is a further illustration with the rotating parts (rotating bodies) removed.

Referring again to FIG. 1, as well as to FIGS. 2 and 3 in succession, the lift force generating aircraft includes the provision of a plurality (typically four) of rollers 12 arranged in both fore and aft located pairs relative to the crosswise extending rotating bodies 24. As best illustrated in FIGS. 2 and 3, the rollers 12 are caused to rotate in response to driven rotation of the cylindrical shaped bodies 24 against which each of the rollers contacts. A center of gravity associated with the machine (aircraft), as is known in the art, corresponds to a location whereby an opposite upward force acting upon that location results in a static condition.

In operation, a propeller 16, otherwise known as a thrust generating device associated with the motor or engine, is caused to rotate about its shaft 17 (extending in the fore to aft axial direction 13) through a driving force generated by an engine 20 in turn connected to a frame 22 of the aircraft. It is also known that the propeller can be substituted by other force generating structures, such as associated with jet engines, within the scope of the invention. A supported and rotatably driven pulley 18 rotates with the shaft 17, a drive belt 14 extending in offset angular fashion from the pulley and, as best shown in the front plan view of FIG. 9, engaging a conically narrowed and interconnecting location established at a centerpoint between the rotatable bodies 24. The ratio established between the diameters of the two pulleys determines their ratio of speed.

Rotation of the cylindrical bodies 24, along directional arrow 26, in turn causes the adheringly contacting rollers 12 to be rotatably driven in an opposite direction 27 (see FIG. 3). The driven rollers 12 are rotatably mounted about a rectangular-shaped frame 15 arranged in proximity to the front and rear facing and crosswise extending surfaces associated with the rotating bodies 24 and which operate in order to render a low friction bed for the rotating bodies. The attachment of the rotating bodies 24 to the pulley 15 can be flexible in a fashion which permits the rotating bodies to bend backwards, see as generally referenced by arrow 29 as well as phantom positions 24' of the rotating bodies in FIG. 1.

FIG. 2 in particular is a perspective view similar to that shown in FIG. 1 and further illustrating in phantom the frame-mounted and additional smaller rollers 12 arranged in forward and rearward spaced pairs and supported upon the frame 15. As previously described, FIG. 3 is a further illustration with the rotating bodies 24 removed. It is also known that, in addition to cylindrical shapes, the rollers can be provided in other forms, including conical, spherical, and modified cylindrical shapes, just to name a few possibilities.

Figure 4:
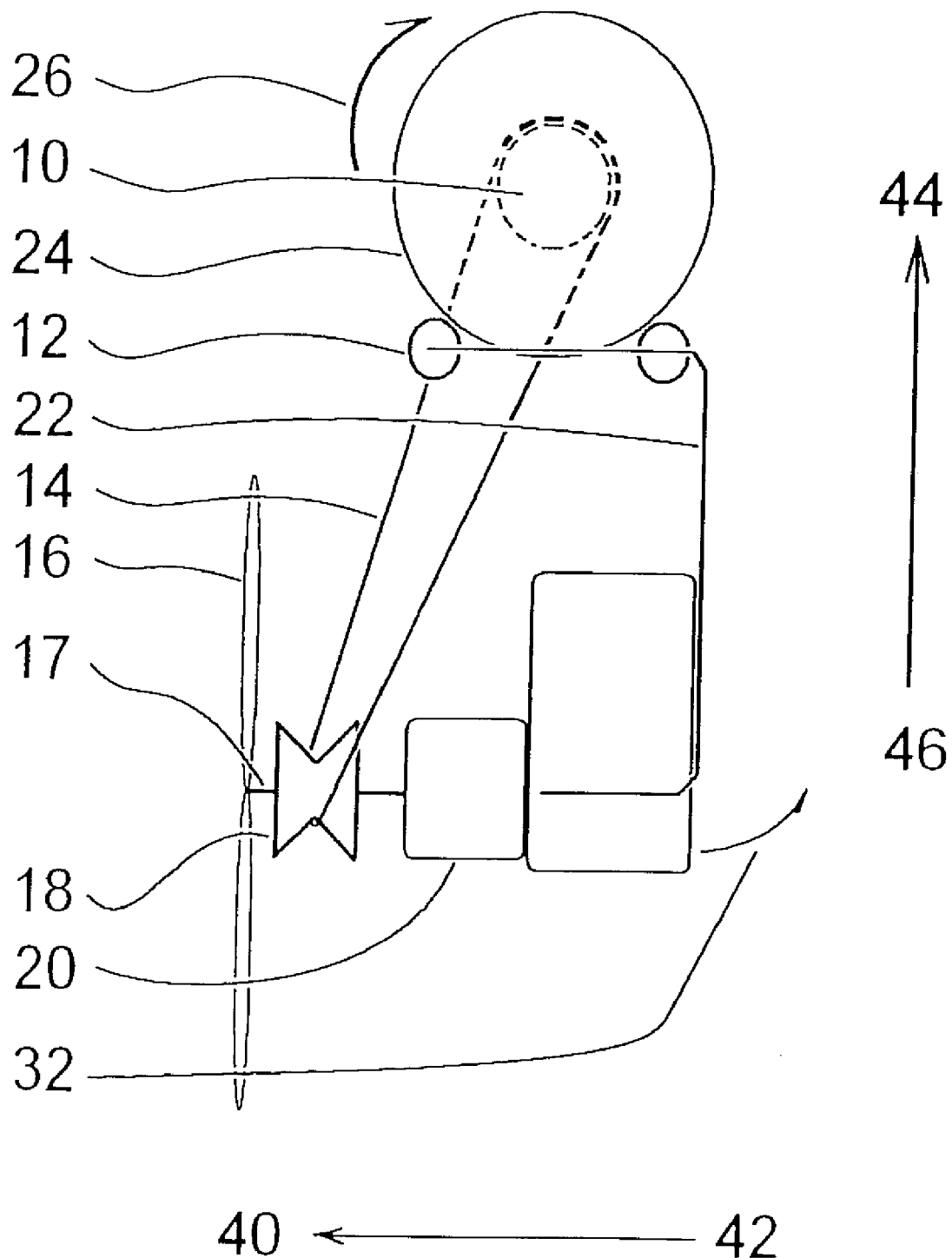
FIG. 4 is a side plan view illustrating the opposing thrust forces and reaction forces generated by the rotating bodies and in relation to the associated components of the lift-generating device.
Figure 5:
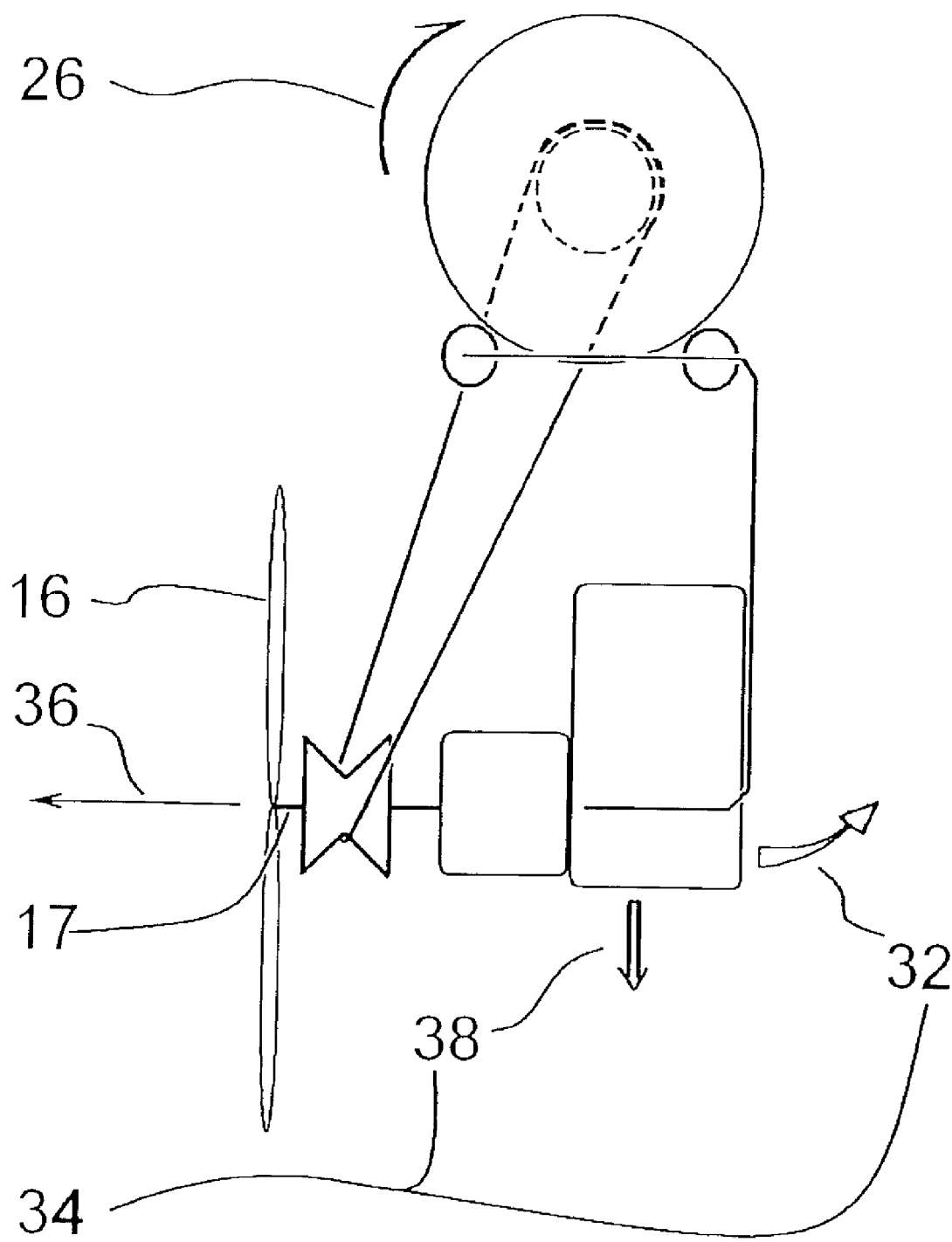
FIG. 5 is a similar view to that shown in FIG. 4 and further illustrating the opposing forces including the center of gravity of the machine (in addition to any added load) and the reaction force of the rotating bodies.
Figure 6:
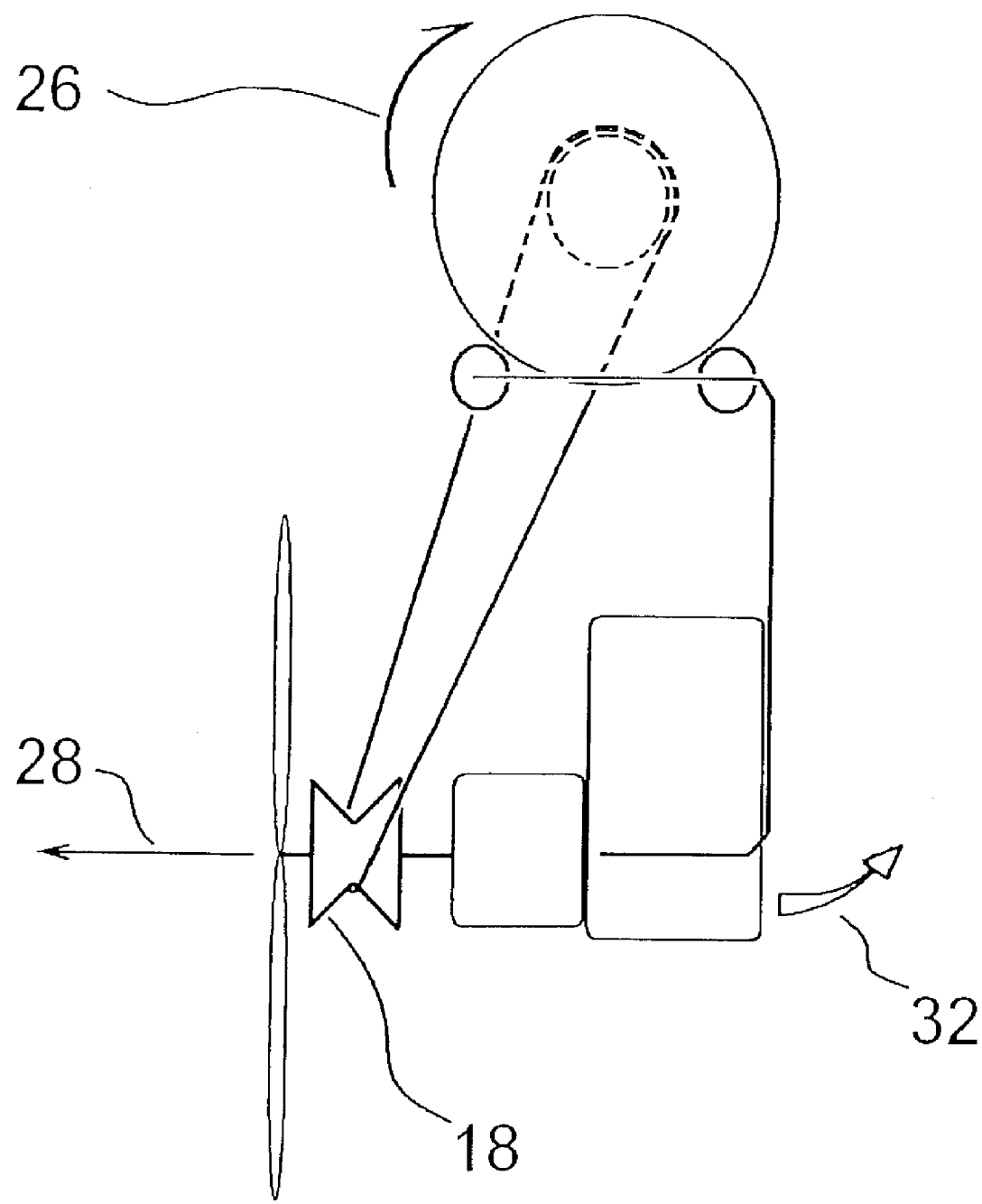
FIG. 6 is another view similar to that shown in FIGS. 4 and 5 and which illustrates the opposing thrust force and reaction force created by the rotating bodies.

Referring now to FIGS. 4-6, a series of side plan views are shown illustrating the opposing thrust forces and reaction forces generated by the rotating bodies, these being circular in cross section, and in relation to the associated components of the lift-generating device. Specifically, air stream forces are illustrated generally at 30, these being created by the motion of the craft through the air.

Reaction forces to the rotation of the bodies 24 are further illustrated by directional arrow 32 and are opposed by additional forces, see directional line 34. Yet additional force vectors are represented by the forward (traction) motion of the craft through the air (see as shown by arrow 28 in FIG. 6 and by arrow 36 in FIG. 5), as well as downward gravity forces represented by arrow 38 (again FIG. 5).

Additional directional indicators referencing locations of the aircraft include those corresponding to the front 40, back 42, top 44, bottom, left side 48 and right side 50. The structure of the aircraft is largely not shown in the present drawings, but is understood to correspond to any desired fuselage and relative structure for capably supporting and carrying one or more pilots and/or passengers.

Figure 7:
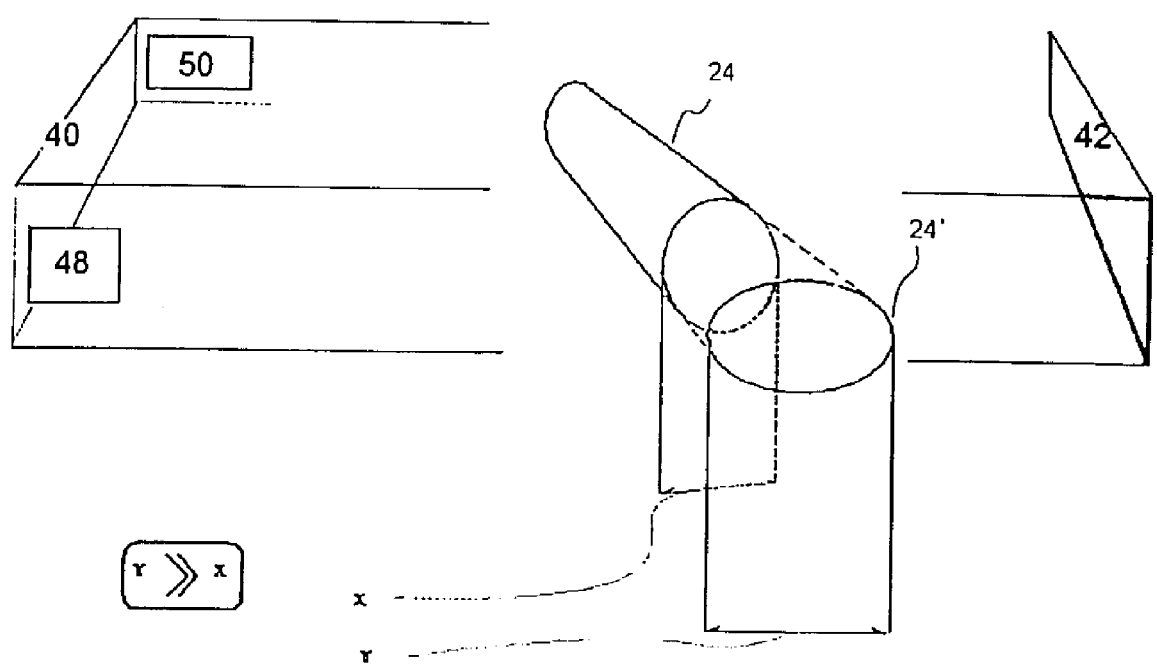
FIG. 7 is a diagrammatic view illustrating the difference between oblique and perpendicular cross-sections of the rotating bodies.
Figure 8:
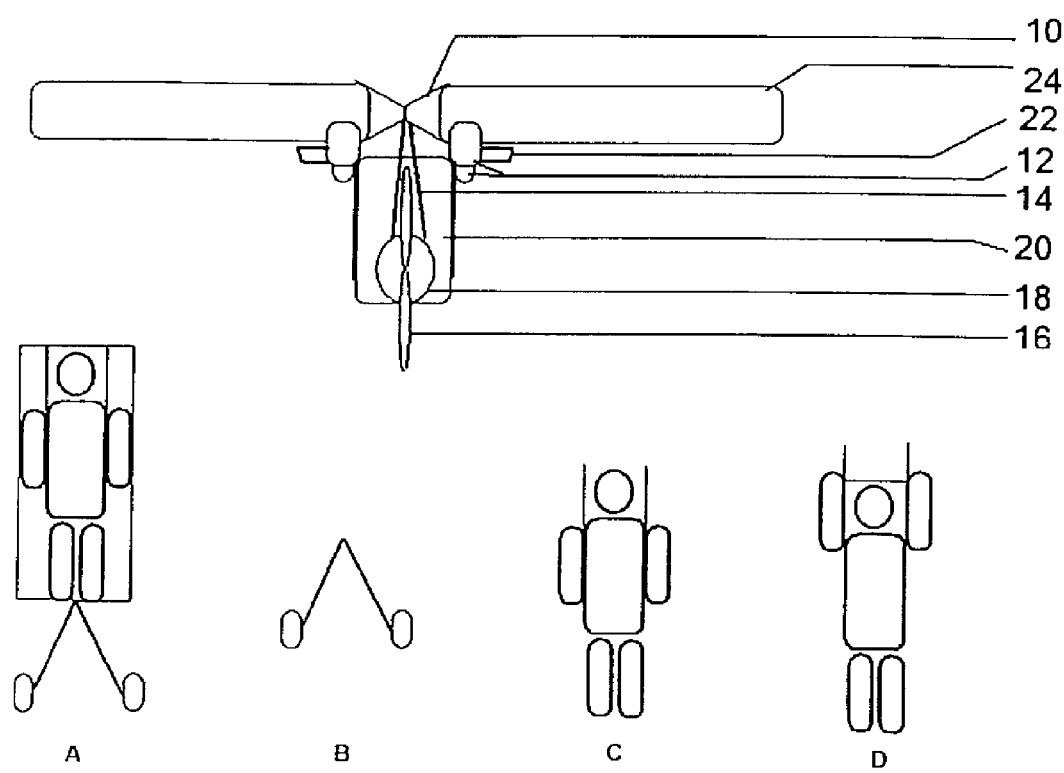
FIGS. 8A-8D illustrate a series of frontal views of different aircraft prototypes according to further preferred variants, with some of the accessories and illustrating some possible ways of personal use and landing gears.

FIG. 7 is a diagrammatic view illustrating the difference between oblique and perpendicular cross-sections of the rotating bodies, see at 24 and 24'. As described previously, rearward swiping, or bend back, of the bodies 24 results in no actual change to their shape, although the effect of an elliptical surface is experienced by wind vectors impacting the surfaces of the angled and rotating bodies, thus resulting in reduced drag and turbulence forces.

Furthermore, by increasing the inflation pressure of the rotatable bodies 24 (or alternately by adjusting the gripping force exerted by the connecting pulley belt), this adjusts the degree of flexibility to the bend-back forces created, in order to adjust the performance characteristics of the craft in relation to the various rotational and anti-drag forces.

FIGS. 8A-8D illustrate a series of frontal views of deflated rotating bodies in a prototype according to further preferred variants, with some of the accessories and illustrating some possible ways of personal use and landing gears. In particular, FIG. 8A illustrates at 52 an individual located in an aircraft cabin with landing gears. FIG. 8B illustrates the aircraft landing gear separately 54. FIG. 8C illustrates the individual suspended 56 and, at FIG. 8D, suspended by his/her hands.

In operation, and as previously described, an advantage achieved by the current invention is in reduced fuel consumption and due to less drag force created in comparison to prior art lift generating devices which use rotating bodies to generate lift force. When considering that drag forces, caused by turbulent airflow at the back of rotating bodies, increase as a result of increased forward speed, this effect has been reduced in the current invention as a result of the ability to modify (or vary) the angle established between the rotation (crosswise) axis 11 of the rotating bodies 24 and the fore to aft axis 13 of the machine. Swiping (or again bending) back of the rotating bodies (see again directional arrow 29), reduces this angle from 90 degrees, resulting in a decrease in turbulence occurring behind the rotating bodies, with an ultimate decrease in the drag forces.

In order to maintain each component of the aircraft in a fixed position, it is determined that the center of gravity of the craft and its propeller (or any other associated thrust generating part) be positioned lower than the crosswise extending rotating bodies 24, the engine 22 and pulley 15 associated with the driven pulleys 12 being fixed to the frame 22 (see again FIG. 3). In a preferred variant, the rotating bodies should be positioned higher than at least one of the center of gravity or the thrust generating device.

Another advantage of the current invention is its ability to create effective lift forces in an environment of reduced accelerated air streams 30 flowing past the rotating bodies 24, this in effect resulting in lesser or no required takeoff speed (i.e., vertical takeoff capability) and which makes it possible to take off from a ground location without the requirement for a runway, or with a shortened runway. This feature is a result primarily of increased lift forces generated by the rotating bodies, in comparison to airfoils rotated by the engine in the prior art, the present invention making possible vertical lift at lower speeds and also due again to the decrease in drag forces experienced by the frame by the swiping (bending backwards) 29 of the rotating bodies 24 to a decreased angle (less than ninety degrees) established between the crosswise extending and rotating bodies 24 and the fore to aft axis 13 mentioned above.

Yet another advantage achieved by the current invention is the stability of flight and resistance in leaning to left or right during flight, this due to the gyroscopic effect generated by rotation of the rotating bodies, i.e., resistance of the rotating bodies to rotations along axes other than its rotation axis (gyroscopic effect).

Figure 9:
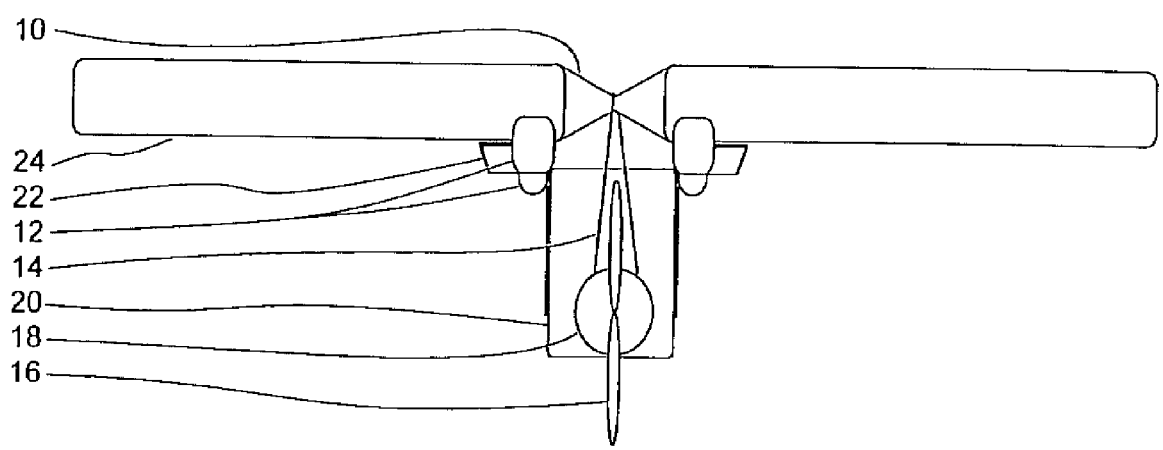
FIG. 9 illustrates a frontal view of a lift-generating mechanism according to a yet further embodiment of the present invention and which incorporates inflated rotating bodies in a prototype with transparent rollers.
Figure 10:
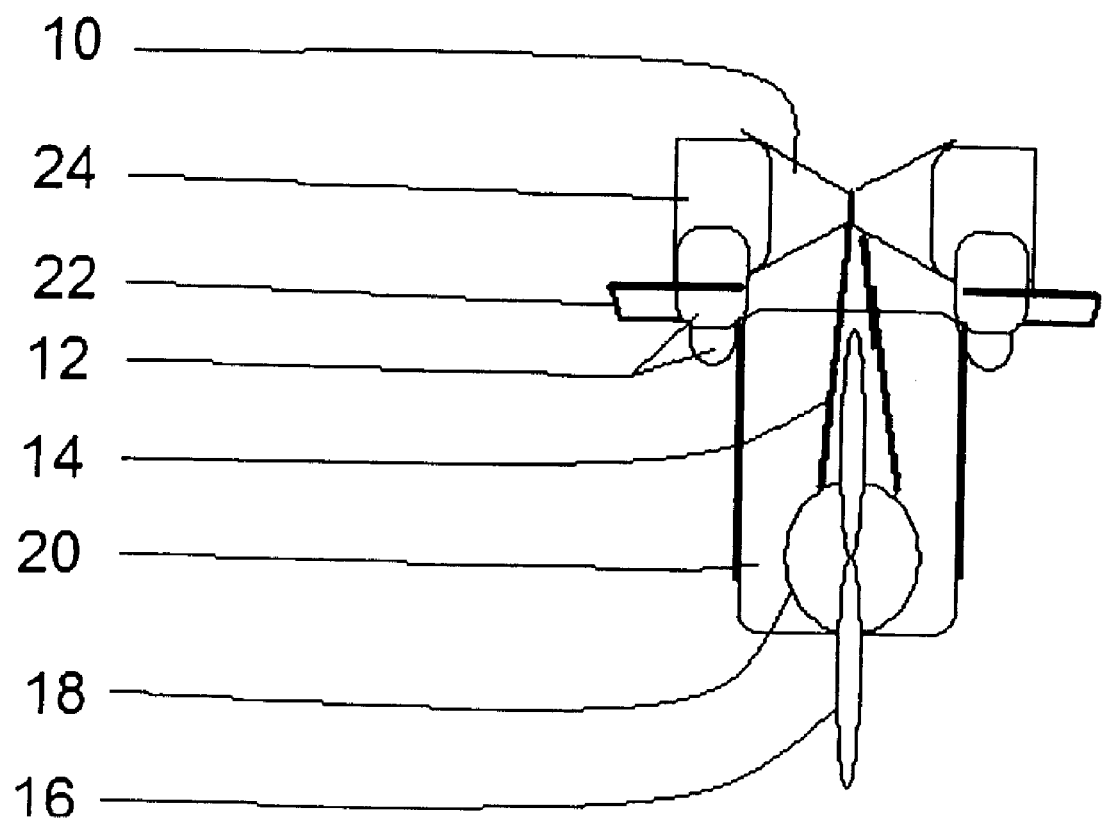
FIG. 10 is a view similar to that shown in FIG. 9 and illustrating the rotating bodies deflated.

A still further advantage of the current invention is the usage of inflatable rotating bodies, as illustrated in FIGS. 9 and 10, in a preferred variant, and as opposed to rigid rotating bodies. The use of an inflatable rotating body is optional in the present invention, however makes possible the ability to deflate the rotating body structure when needed (again FIG. 10), thus rendering the aircraft small enough to be packed, kept or carried in a very small space and makes it ideal for personal usage, especially with easy and cheap shipping/handling due to small occupied volume. A still further advantage of the current invention resides in the usage of differently sized engines 22 to rotate the lift force producing part, and also in generating thrust force, both of which can be controllable. As previously explained, more than one engine can be separately employed for driving the conventional propulsion systems and the rotating bodies.

Yet another advantage of the current invention is that, by using an engine as an active and direct method to rotate the rotating bodies, it is possible to generate significant lift forces even at initial and low speed forward motion, making it more practical compared to the systems using other methods of rotation for rotating bodies, and such as using the flowing air to rotate the rotating bodies as set forth in the Zaparka design.

Yet another advantage of the current invention is faster acceleration in flight, caused by taking off sooner and due to the additional lift force generation by rotating the bodies with engine power 20, and thus reducing friction with the ground after take off, the lower drag forces once again being due to the swiping/bending backwards of the rotating bodies 24.

Another advantage of the current design of this invention is the provision of three different ways to neutralize reaction forces produced by the rotating bodies 24, in a reverse direction to their rotation, and which can cause the lift-producing machine to rotate in the opposite direction. These new mechanisms, used to neutralize the reaction force to the rotation of the rotating bodies 24, and which make the new design specific include 1) placing the rotation axis of the rotating bodies 24 above than the center of gravity of the machine (and the load); 2) placing the point of effect of the thrust force lower than the rotation axis of the rotating bodies 24; and 3) allowing the rotating bodies 24 to bend backwards, relative to their crosswise extending axis, to decrease the angle between the rotation axis of the rotating bodies relative to the fore to aft axis, in particular to less than 90 degrees, thus resulting in the rotating bodies 24 not being in alignment and their rotation reaction forces totaling less than their numerical summation.

Yet another advantage of the current invention is that, in the event of a problem appearing in the thrust generating devices, but not in the lift force generation part (rotating bodies), the aircraft as a result can land more securely compared to current aircrafts, this being due to any movement perpendicular to the axis of rotation inducing a force perpendicular to the axis of movement. Thus, if a problem in the propeller 16 causes the aircraft not to move forward, the resultant reduced speed causes the creation of a force perpendicular to the direction of fall, this in turn generating a thrust force which increases the speed of vertical drop. Ultimately, forward movement in turn causes the generation of a force perpendicular to the forward movement, or lift force, this generated lift force counteracting the gravity and decreasing falling speed ultimately.

Concurrent with the decreased need in runway space for takeoff, a yet further advantage of the current invention is the corresponding lesser requirement for a landing runway. As a result of the generation of more lift force at lower speeds by rotating bodies, it is possible that one can land at lower speeds and thus there is a lesser or no need for runway (such as again which makes possible vertical takeoffs and landings) depending on the rotation speed of the rotating bodies and the weight of the machine and its load (the heavier the load the more need for speed and the faster the rotation speed, the less the need for landing speed).

FIGS. 8A-8D illustrate a series of frontal views of deflated rotating bodies in a prototype according to further preferred variants, with some of the accessories and illustrating some possible ways of personal use and landing gears.

Having described my invention, other and additional preferred embodiments will become apparent to those skilled in the art to which it pertains, and without deviating from the scope of the appended claims.

The invention claimed is:

1. A lift-generating apparatus incorporated into an aircraft, the aircraft including an engine and a thrust force generating device, said apparatus comprising:
    first and second interconnected and crosswise extending elongated and rotating bodies, an axial centerline through said body being in a direction substantially crosswise to a fore to aft axis extending between the engine and thrust generating device; and
    a rotary output associated with said engine rotating said bodies and, in response to air stream forces acting thereupon, deflecting said bodies to an angle between said crosswise direction and said fore to aft axis thereby reducing drag forces experienced on a rear side of said body.

2. The lift-generating apparatus as described in claim 1, said rotating bodies being constructed of a material inflatable to a desired pressure.

3. The lift-generating apparatus as described in claim 2, further comprising said rotatable bodies capable of deflecting in directions fore and aft relative to said centerline.

4. The lift-generating apparatus as described in claim 2, further comprising said rotatable bodies capable of being deflated for ease of storage and transportation.

5. The lift-producing device as described in claim 1, a said axial centerline of said rotating bodies extending above a center of gravity associated with the engine and thrust-generating device.

6. The lift-generating apparatus as described in claim 1, further comprising a shaft mounted and rotatable pulley disposed between the engine and thrust-producing device, a continuous belt extending from said pulley and engaging a narrowed location associated with said interconnected bodies.

7. The lift-generating apparatus as described in claim 6, further comprising a plurality of belt supported and driven rollers contacting surface locations associated with said rotatable bodies.

8. The lift-generating apparatus as described in claim 1, further comprising the centerline of said rotatable body being positioned above at least one of a center of gravity and a thrust force associated with the aircraft.

9. The lift-generating apparatus as described in claim 1, said thrust-producing device further comprising a propeller.

10. A lift force generating aircraft, comprising:
    at least one engine and a thrust force producing device associated with said engine;
    at least one elongated and rotating body, an axial centerline through said body extending in a direction substantially perpendicular to a fore to aft axis extending between the engine and thrust-producing device and at a location above a center of gravity associated with the engine and thrust-producing device, said rotating body being constructed of a material inflatable to a desired pressure; and
    a rotary output associated with said engine rotating said body, said body swiping to angles lesser than said perpendicular with said fore to aft axis, and in response to air stream forces acting upon said body in order to reduce drag forces experienced on a rear side of said body.

11. The lift-generating apparatus as described in claim 10, further comprising a shaft mounted and rotatable pulley disposed between the engine and thrust-producing device, a continuous belt extending from said pulley and engaging a narrowed location associated with said interconnected bodies.

12. The lift-generating apparatus as described in claim 11, further comprising a plurality of belt supported and driven rollers contacting surface locations associated with said rotatable bodies.

13. The lift-generating apparatus as described in claim 11, further comprising said centerline associated with said rotatable body located at a higher elevation as compared to the thrust-producing device.

14. The lift-generating apparatus as described in claim 10, said thrust-producing device further comprising a propeller.

15. The lift-generating apparatus as described in claim 10, further comprising said rotatable bodies capable of being deflated for ease of storage and transportation.

16. A lift force generating aircraft, comprising:
    an engine and a thrust force producing device defined along a fore to aft extending axis, said thrust force producing device further comprising an aircraft propeller interconnected to the engine by a drive shaft;
    a pair of oppositely extending, elongated and rotating bodies, an axial centerline through said body extending in a direction substantially perpendicular to the fore to aft axis extending between the engine and thrust-producing device and at a location above a center of gravity associated with the engine and thrust-producing device, said rotating body being constructed of a material inflatable to a desired pressure; and
    a shaft rotated pulley disposed between the engine and propeller driving a belt interconnecting a central interconnecting location of said rotating bodies and such that a rotary output associated with the engine rotates said bodies, said bodies swiping to angles lesser than said perpendicular with said fore to aft axis, and in response to air stream forces acting upon said body in order to reduce drag forces experienced on a rear side of said body.

* * * * *

UNITED STATES PATENT AND TRADEMARK OFFICE
CERTIFICATE OF CORRECTION

PATENT NO. : 7,427,047 B2 Page 1 of 1
APPLICATION NO. : 11/138130
DATED : September 23, 2008
INVENTOR(S) : Omid Saeed Tehrani It is certified that error appears in the above-identified patent and that said Letters Patent is hereby corrected as shown below:

Column 7, line 8 after "capably" delete --5--

Signed and Sealed this

Twenty-third Day of December, 2008

JON W. DUDAS
*Director of the United States Patent and Trademark Office*